(12) United States Patent
Schmidt (10) Patent No.: US 12,030,621 B2
(45) Date of Patent: Jul. 9, 2024

(54) COUPLED GAS SPRINGS ON ADJACENT GEARS FOR THE AVOIDANCE OF FAILURE CASE LOADS

(71) Applicant: Safran Landing Systems Canada Inc., Ajax (CA)

(72) Inventor: Robert Kyle Schmidt, Brooklin (CA)

(73) Assignee: Safran Landing Systems Canada, Inc., Ajax (CA)

( * ) Notice: Subject to any disclaimer, the term of this patent is extended or adjusted under 35 U.S.C. 154(b) by 13 days.

(21) Appl. No.: 17/733,659

(22) Filed: Apr. 29, 2022

(65) Prior Publication Data

US 2023/0348049 A1    Nov. 2, 2023

(51) Int. Cl.
*B64C 25/60*  (2006.01)
*F16F 9/06*  (2006.01)

(52) U.S. Cl.
CPC .............. *B64C 25/60* (2013.01); *F16F 9/063* (2013.01); *F16F 9/067* (2013.01)

(58) Field of Classification Search
CPC .......... B64C 25/60; B64C 25/62; F16F 9/067; F16F 9/073
See application file for complete search history.

(56) References Cited

U.S. PATENT DOCUMENTS

| | | | | |
|---|---|---|---|---|
| 4,062,507 A | * | 12/1977 | Felder | B64C 25/00 244/104 FP |
| 4,519,559 A | * | 5/1985 | Logan | B64C 25/52 244/108 |
| 4,648,490 A | * | 3/1987 | Bergloff | B64C 25/60 188/297 |
| 6,120,009 A | * | 9/2000 | Gatehouse | B64C 25/60 267/64.11 |
| 2007/0221783 A1 | * | 9/2007 | Parks | G06Q 30/08 244/102 A |
| 2013/0181090 A1 | * | 7/2013 | Martinez Elkington | B64C 25/58 244/100 R |
| 2016/0272309 A1 | * | 9/2016 | Schmidt | B64C 25/60 |
| 2016/0327114 A1 | * | 11/2016 | Schmidt | F16F 9/36 |
| 2018/0141644 A1 | * | 5/2018 | Waltner | B64C 25/60 |
| 2022/0388633 A1 | * | 12/2022 | Page | B64C 39/10 |
| 2022/0388638 A1 | * | 12/2022 | Guidoux | B64F 5/60 |

FOREIGN PATENT DOCUMENTS

WO    2021/094319 A1    5/2021

* cited by examiner

*Primary Examiner* — Tye William Abell
(74) *Attorney, Agent, or Firm* — CHRISTENSEN O'CONNOR JOHNSON KINDNESS PLLC (57) ABSTRACT

A shock absorber system for a vehicle includes a first shock absorber with a first cavity and a second shock absorber with a second cavity, wherein the first and second shock absorbers are located on a same side of the vehicle. The shock absorber system further includes a conduit in fluid communication with the first and second shock absorbers so that the second cavity maintains fluid communication with the first cavity through the conduit. The first and second cavities are at least partially filled with a gas.

17 Claims, 6 Drawing Sheets

COUPLED GAS SPRINGS ON ADJACENT GEARS FOR THE AVOIDANCE OF FAILURE CASE LOADS

BACKGROUND

Most typical aircraft have three landing gears: two main landing gears and a single nose landing gear. The main landing gears are symmetrically located on opposite sides of the butt line 0 (BL0) centerline plane. For larger aircraft, it may be advantageous to have more than one main landing gear per side of the aircraft. In the case where there are two identical main landing gears on each side of the aircraft, the loads carried by each main landing gear would be approximately ¼ the weight of the entire aircraft.

Figure 1:
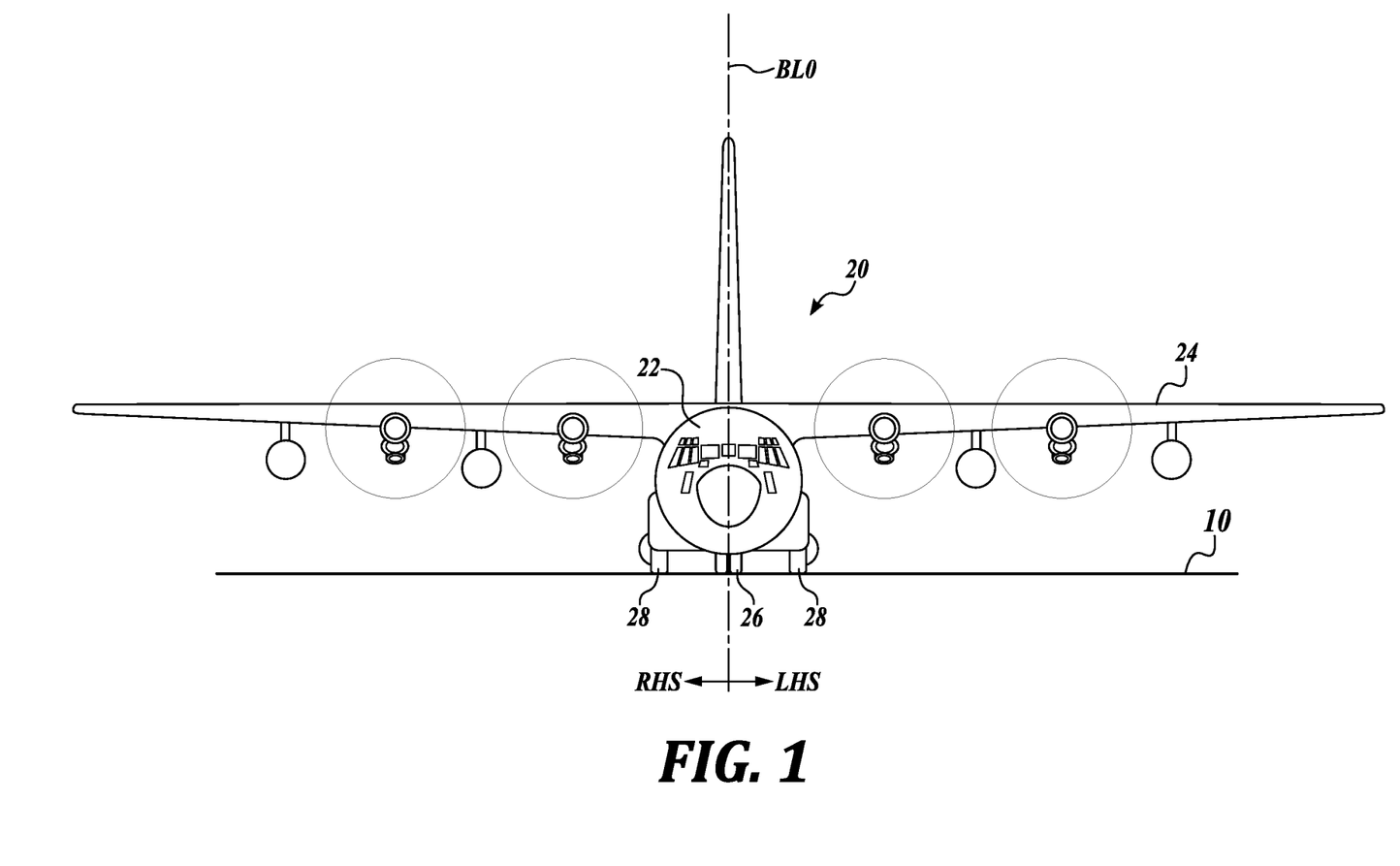
FIG. 1 shows a front view of an aircraft with multi-post main landing gears.
Figure 2:
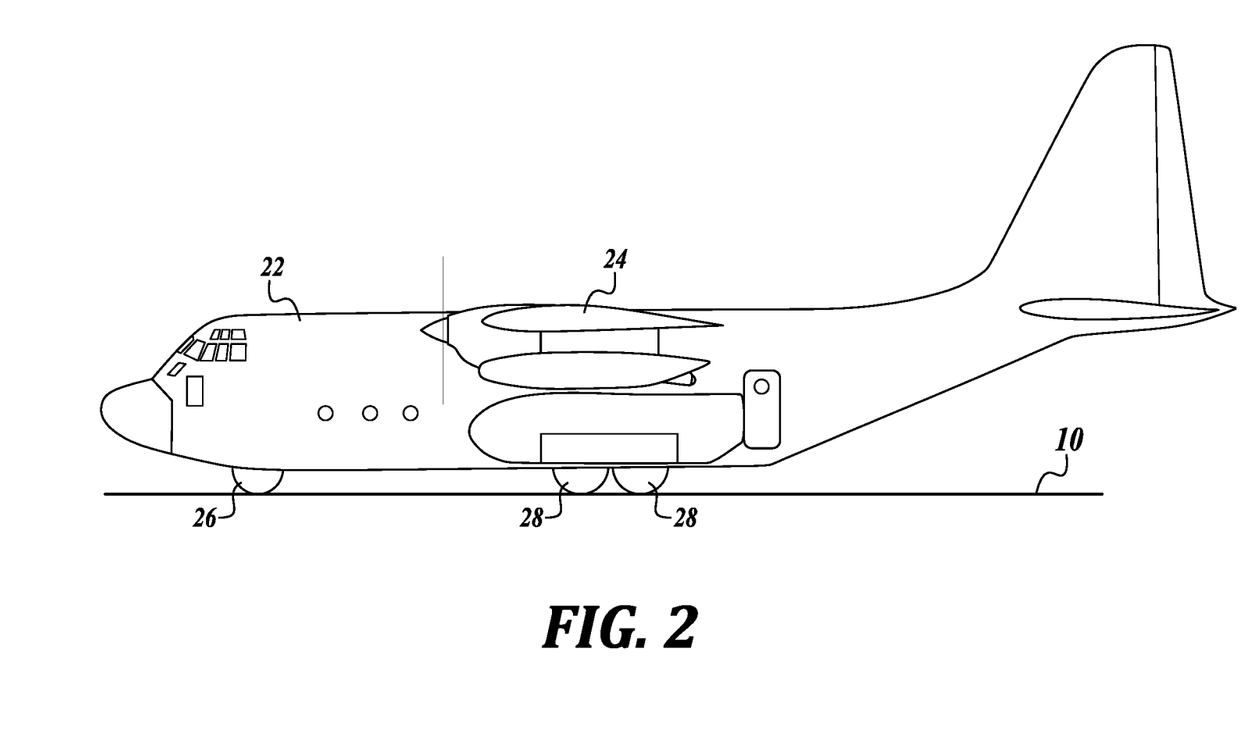
FIG. 2 shows a side view of the aircraft shown in FIG. 1.

FIGS. 1 and 2 show a front view and a side view, respectively, of an exemplary aircraft 20 with multiple main landing gears on each side. The aircraft 20 has a fuselage 22 and a wing 24 extending laterally from each side. A nose landing gear 26 is positioned at a forward end of the aircraft 20 at BL0, and a pair of main landing gears 28 is located on each side of BL0. When the aircraft 20 is in a weight-on-wheels condition, for example, upon landing, during taxiing, when the aircraft is parked, etc., the nose landing gear 26 and the main landing gears 28 extend downward and contact the ground 10 to support the aircraft.

Figure 3:
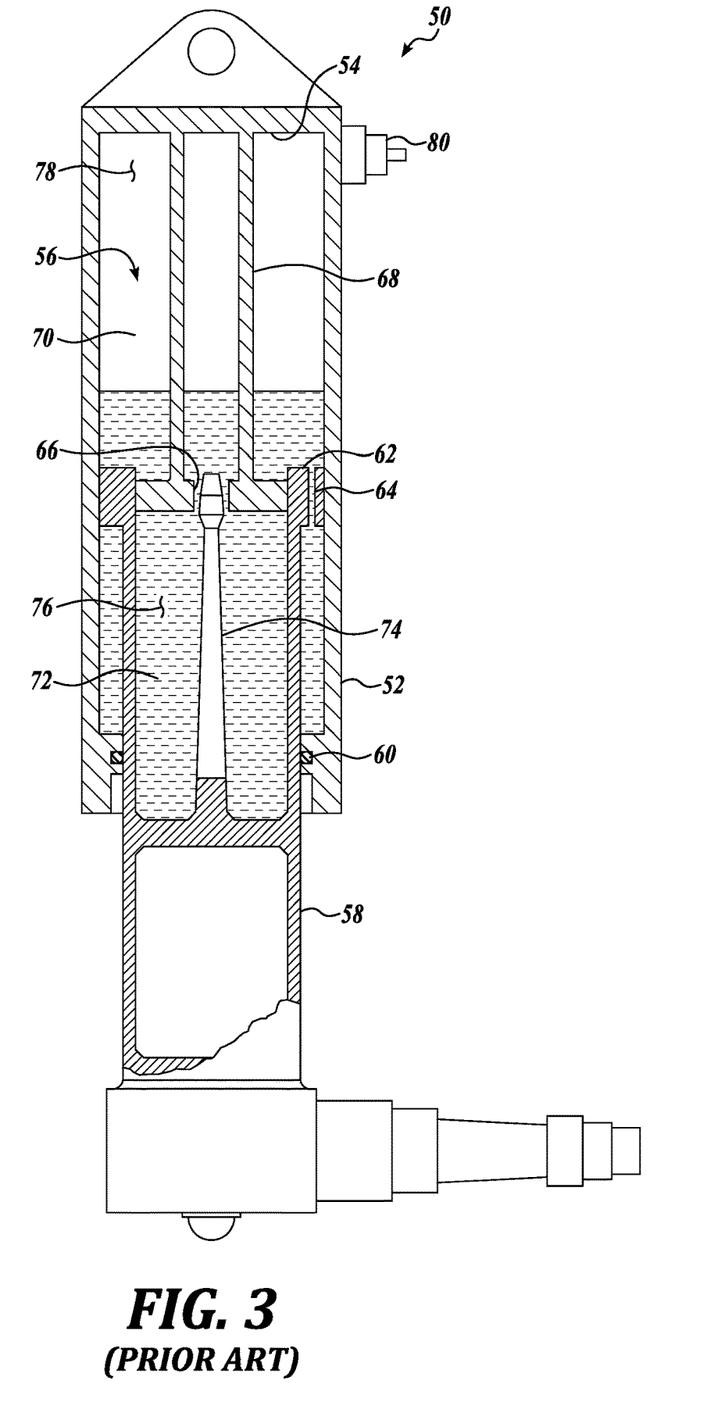
FIG. 3 shows a cross-sectional view of a known oleo-pneumatic shock absorber.

FIG. 3 shows a representative embodiment of a known oleo-pneumatic shock absorber 50 typical of the type used with the main strut of aircraft landing gear. The shock absorber 50 is disclosed in U.S. Patent Application Publication No. 2016/0327114, by Schmidt, which is assigned to Safran Landing Systems UK Ltd., the disclosure of which is incorporated by reference in its entirety herein.

The shock absorber 50 includes an inner housing portion 58, slidably coupled within an outer housing portion 52 by one or more bearings 62 with at least one orifice 64 extending therethrough. The housing portions 52 and 58 are sealingly engaged by a seal 60 and cooperate to define a cavity 56 having an upper chamber 70 and a lower chamber 72. The lower chamber 72 contains a fluid 76, such as oil, and the upper chamber 70 is at least partially filled with a gas 78, such as air. An orifice support tube 68 extends from an end wall 54 of the upper chamber 70 and fixedly positions an orifice 66 extending between the upper chamber 70 and the lower chamber. A metering pin 74 is fixedly secured to the inner housing portion 58 and extends through the orifice 66 to selectively limit the flow of the fluid 76 through the orifice. A valve 80 is mounted to the outer housing portion 52. The valve 80 provides selective fluid communication with the cavity 56 to enable addition or purging of fluid 76 and/or gas 78 into the cavity as needed during initial assembly and/or to provide and maintain desired performance characteristics of the shock absorber in service.

In operation, the shock absorber 50 acts as a damped spring. When a load is applied to the shock absorber 50, such as when an aircraft weight-on-wheels condition is achieved upon landing, the inner housing portion 58 slides into the outer housing portion 52. As the inner housing portion 58 moves into the outer housing portion, the volume of the cavity 56 is reduced, and the gas 78 inside the cavity is compressed to provide a resistive spring force. When the shock absorber 50 is fully compressed, the loads on the shock absorber are supported by the compressed gas 78. When load is removed from the shock absorber 50, such as following take off, the pressure of the compressed gas 78 drives the inner housing portion 58 out of the outer housing portion 52 so that the shock absorber 50 extends to assume its uncompressed length. As the shock absorber 50 compresses and extends, the fluid 76 is forced through the orifice 66 to provide viscous damping to the spring characteristics provided by the compressed gas 78.

During weight on wheels conditions, e.g., upon landing, during taxiing, when the aircraft is parked, etc., the load on a typical landing gear is carried the shock absorber, and more specifically, by the compressed gas within the shock absorber. For aircraft with multiple main landing gears on each side of the aircraft, such as shown in FIGS. 1 and 2, if the shock absorber of a single main landing gear fails or develops a leak of the compressed gas (referred to herein collectively as "fails" or experiences "a failure"), the weight previously supported by the failed shock absorber is supported by the adjacent shock absorber, i.e., the remaining landing gear on that side of the aircraft. Designing landing gear and the associated mounting structure with twice the capability as would otherwise be required adds undesirable cost, weight, and complexity to the aircraft.

SUMMARY

The present disclosure provides examples of a shock absorber system for use with a vehicle, such as an aircraft with multiple main landing gears on each side of the aircraft. In an embodiment, the shock absorber system includes a first shock absorber with a first cavity and a second shock absorber with a second cavity, wherein the first and second shock absorbers are located on a same side of the vehicle. The shock absorber system further includes a conduit in fluid communication with the first and second shock absorbers so that the first cavity maintains fluid communication with the second cavity through the conduit. The first and second cavities are at least partially filled with a gas.

In any embodiment, a valve is mounted to the conduit and selectively provides fluid communication with the first and second cavities.

In any embodiment, the valve is a fill valve configured to selectively introduce additional gas into the conduit.

In any embodiment, the shock absorber system further includes a reservoir in fluid communication with the valve and a controller operably connected to the valve. The controller is programmed to selectively move the valve between a closed position and an open position. The reservoir is in fluid communication with the conduit when the valve is in the open position, and the reservoir is fluidly isolated from the conduit when the valve is in the closed position.

In any embodiment, the vehicle is an aircraft, and each shock absorber supports a load on a corresponding landing gear.

In any embodiment, the controller is programmed to move the valve to the open position when the aircraft is in a weigh-on-wheels state.

In any embodiment, the controller is programmed to move the valve to the open position during a landing sequence.

In any embodiment, the controller is programmed to move the valve to the closed position during takeoff roll.

In any embodiment, the controller is programmed to move the valve between a closed position and an open position to selectively control a spring constant of at least one of the shock absorbers.

In accordance with another embodiment, a shock absorber system for a vehicle is provided. The shock absorber system may comprise a first shock absorber with a first cavity, a pressure sensor disposed within the first cavity, and a first valve configured to provide selective fluid communication between the first cavity and an atmosphere. The shock absorber system further comprises a second shock absorber with a second cavity, a second pressure sensor disposed within the second cavity, and a second valve configured to provide selective fluid communication between the second cavity and the atmosphere, wherein the second shock absorber is located on a same side of the vehicle as the first shock absorber. A controller is in operable communication with the first and second pressure sensors and the first and second valves. The controller is programmed to receive signals from the first and second pressure sensors corresponding to sensed first and second pressures, respectively, and to selectively open the first and second valves according to signals received from the first and second pressure sensors.

In any embodiment, the controller is programmed to open the second valve when the first pressure falls below a first predetermined threshold.

In any embodiment, the controller is programmed to open the first valve when the second pressure falls below a second predetermined threshold.

In any embodiment, the first threshold equals the second threshold.

In any embodiment, opening the first valve vents the first cavity to an atmosphere, and opening the second valve vents the second cavity to the atmosphere.

In any embodiment, the vehicle is an aircraft, and each shock absorber supports a load on a corresponding landing gear.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion provides examples of a shock absorber system for use with vehicles and in particular, aircraft, wherein a failure of one shock absorber does not result in undue loading of another shock absorber or associated vehicle structure located on the same side of the vehicle. Embodiments of the shock absorber system are described as having two shock absorbers, each shock absorber being included in a main landing gear located on the same side of an aircraft, however, it will be appreciated that embodiments with additional shock absorbers, i.e., more than two, are possible. Further, while embodiments of the shock absorber systems are described as being used in conjunction with aircraft landing gears, the shock absorber systems may advantageously be utilized with other vehicles.

Figure 4:
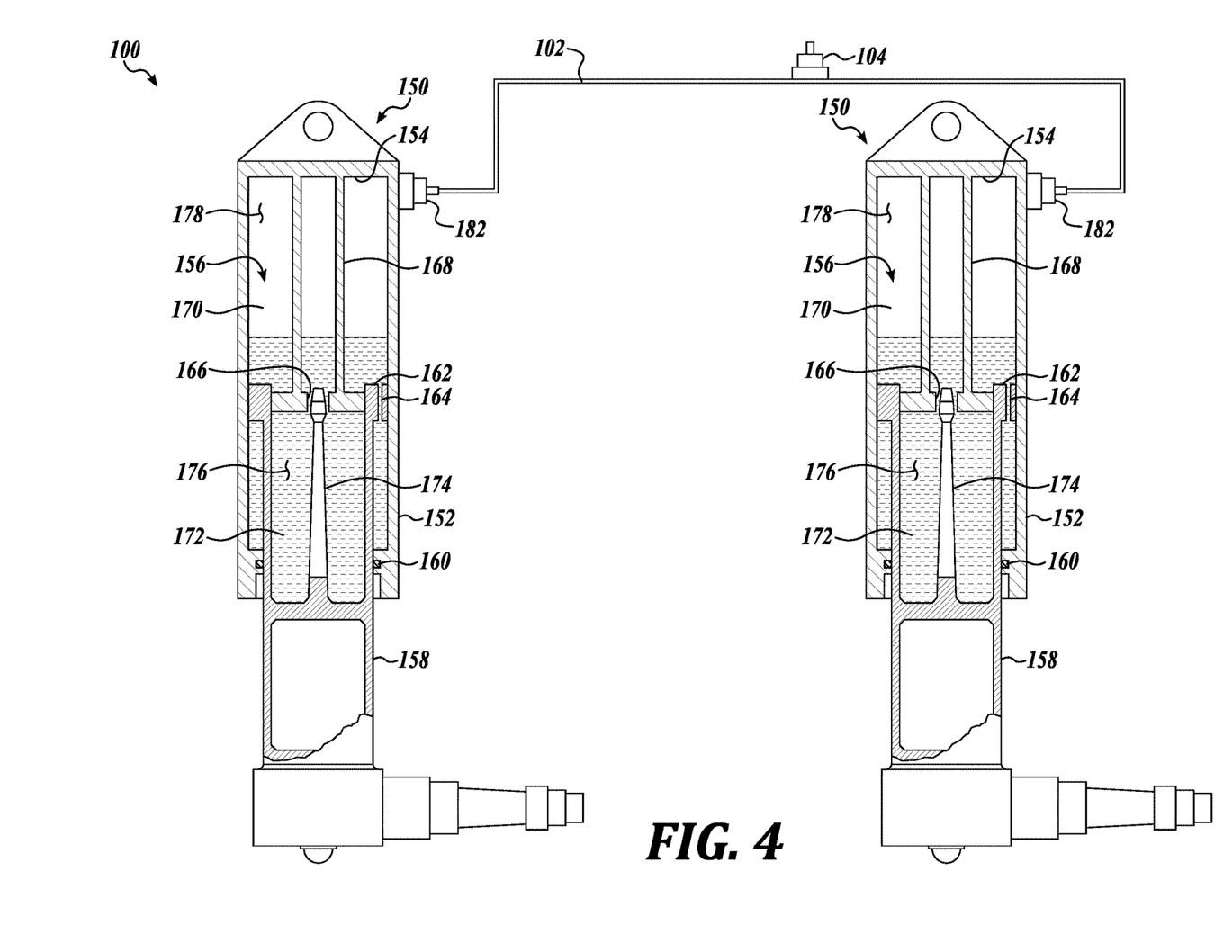
FIG. 4 shows a cross-sectional view of a shock absorber system for multi-post landing gears in accordance with an embodiment of the present disclosure.

FIG. 4 illustrates an embodiment of a shock absorber system, generally designated 100, formed in accordance with aspects of the present disclosure. The shock absorber system 100 includes a pair of shock absorbers 150 that are substantially similar in construction and operation as the shock absorber 50 described above with regard to FIG. 3, except for the differences that will be described in more detail below. Components of the shock absorbers 150 shown in FIG. 4 that are labeled with reference number 1XX correspond to similar components labeled with reference number XX in FIG. 3, except as noted. For example, the outer housing portion 152 shown in FIG. 4 is similar to the outer housing portion 52 shown in FIG. 3 unless otherwise described.

The shock absorber system 100 shown in FIG. 4 includes two shock absorbers 150. Each shock absorber 150 is included in one of two adjacent main landing gears, both of which are located on the same side of the aircraft. The shock absorbers 150 are similar to the previously described shock absorber 50 except that each has a port 182 mounted to or integrally formed with the outer housing portion 152. The port 182 can be in lieu of or in addition to the valve 80 of the previously described shock absorber 50. A conduit 102 is coupled at each end to one of the ports 182 so that the cavities 156 of the shock absorbers 150 are in fluid communication with each other through the conduit 102. Because of this fluid communication, the pressure within the cavities 56 is equalized, i.e., the pressures within the two cavities remain the same, and the shock absorbers 50 effectively share a single gas chamber.

A fill valve 104 is coupled to the conduit 102 to provide selective access to the interior of the conduit 102 and, therefore the cavities 156 of the shock absorbers 150. The valve 104 is configured gas source can be coupled to the valve 104 to increase the amount of gas 178 within the shock absorbers 150. The valve 104 can also be opened to purge gas 178 from the shock absorbers 150. By controlling the amount of gas 178 in the shock absorbers 150, the pressure within the cavities 156 and, therefore, the spring characteristics of the shock absorbers can be tailored to provide a desired performance.

In operation, the compressed gas 178 in the shock absorbers 150 support the weight reacted through the corresponding landing gear. In the event that one of the shock absorbers fails, the pressure within the cavities 156 of both shock absorbers 150 will decrease by virtue of the fluid connection through the conduit 102. By reducing the pressure within both shock absorbers 150 simultaneously, any difference in spring force capability of the two shock absorbers relative to each other is eliminated or minimized by a failure. This, in turn, reduces or eliminates any transfer of load that would otherwise occur in traditional landing gear systems. That is, the shock absorber with the failure will not have its spring constant reduced so much that an undesirable amount of load normally reacted through "softer" failed shock absorber is reacted through the "stiffer" shock absorber without the failure. In other words, a failure of either shock absorber will reduce the spring coefficient of both shock absorbers so that any load transferred from one shock absorber to the other is reduced or eliminated.

Figure 5:
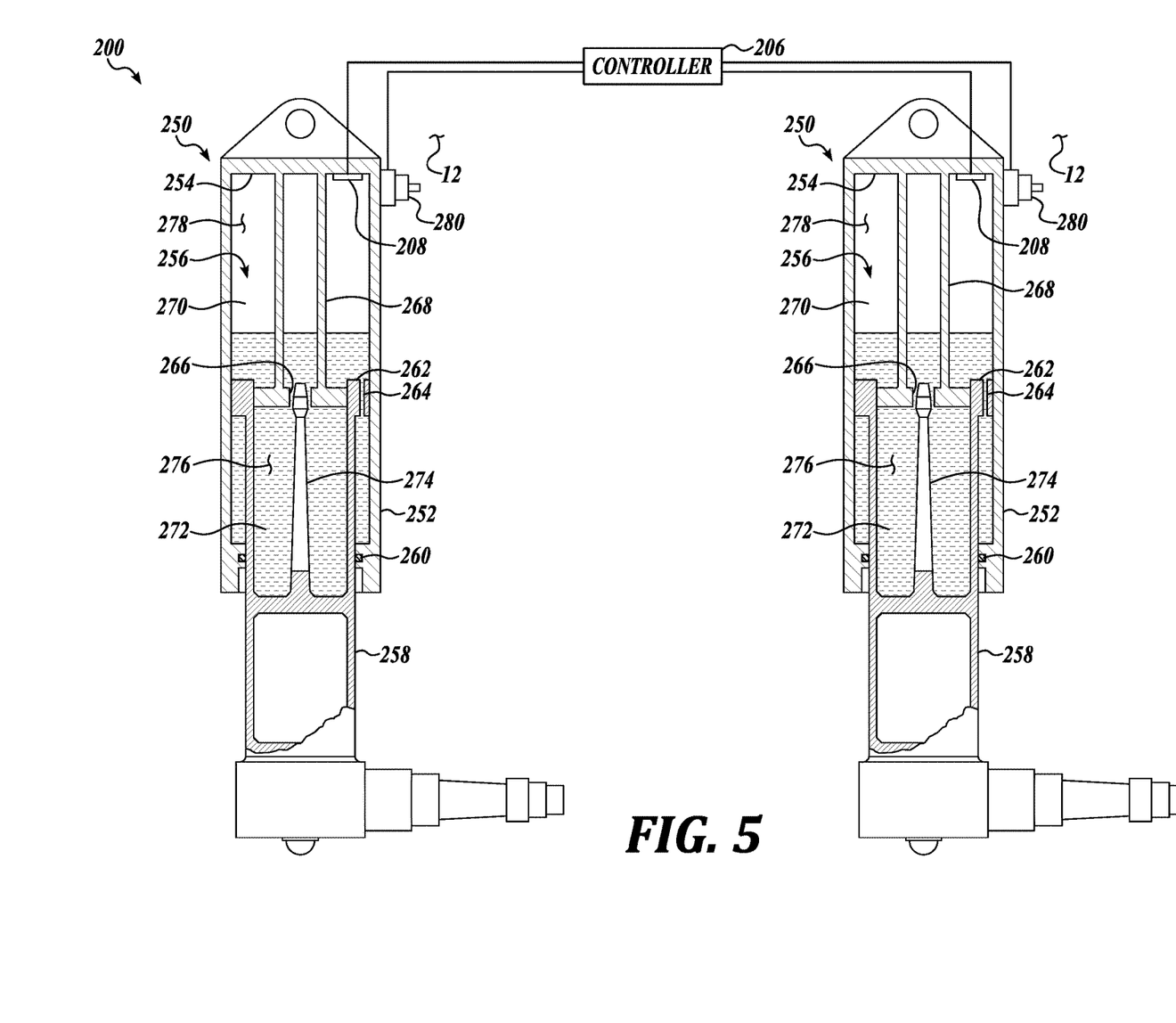
FIG. 5 shows a cross-sectional/schematic view of a shock absorber system for multi-post landing gears according to another embodiment of the present disclosure.

FIG. 5 illustrates another embodiment of a shock absorber system, generally designated 200, formed in accordance with aspects of the present disclosure. The shock absorber system 200 includes a pair of shock absorbers 250 that are substantially similar in construction and operation to the shock absorber 50 described above with regard to FIG. 3, except for the differences that will be described in more detail below. Components of the shock absorbers 250 shown in FIG. 5 that are labeled with reference number 2XX correspond to similar components labeled with reference number XX in FIG. 3, except as noted. For example, the outer housing portion 252 shown in FIG. 5 is similar to the outer housing portion 52 shown in FIG. 3 unless otherwise described.

Each of the shock absorbers 250 includes a pressure sensor 208 configured to sense a pressure within the cavity 256 of the shock absorber. The pressure sensor 250 communicates with a controller 206 and provides signals corresponding to the sensed pressure within the cavity 256. In some embodiments, the pressure sensor 208 is a capacitive pressure sensor, an electromagnetic pressure sensor, a piezoelectric pressure sensor, or pressure strain-gauge. In some embodiments, the pressure sensor 208 is any pressure sensor configured to sense, directly or indirectly, an absolute or relative pressure within the cavity 256 of the associated shock absorber 250.

The controller 206 is also in communication with the valve 280 of each shock absorber 250. Each valve 280 is configured to be selectively actuated by the controller 206 to reciprocate between an open state, in which the cavity 256 is in fluid communication with the atmosphere 12, and a closed state, in which the cavity 256 is fluidly isolated from the atmosphere. Thus, the controller 206 is capable of selectively venting the cavity 256 of either shock absorber 250 to reduce the pressure within the cavity.

During operation, the controller 206 monitors the signals received from the pressure sensors 208 to determine if a failure has occurred in one of the shock absorbers 250. In some embodiments, a failure is indicated in a shock absorber 250 when the sensed pressure in that shock absorber falls below a predetermined threshold value. In some embodiments, this predetermined threshold value is a percentage of a nominal operating pressure. In some embodiments, the predetermined threshold is 70%, 80%, or 90% of the nominal operating pressure. In some embodiments, a failure is indicated when the difference between the sensed pressures of the shock absorbers is greater than a predetermined threshold value. In some embodiments, a failure of one of the shock absorbers 250 is detected by any suitable method based on the sensed pressure in each shock absorber.

When a failure occurs in a shock absorber 250, the pressure in that shock absorber decreases, which reduces the effective spring constant of that shock absorber, i.e., that shock absorber becomes "softer." In response to a detected failure of one shock absorber 250, the controller 206 opens the valve 280 of the other shock absorber to vent gas 278 from the cavity 256 to the atmosphere 12. Venting the gas 278 in this manner reduces the pressure in the vented shock absorber 250 so that the spring constant of the vented shock absorber decreases to better match the spring constant of the failed shock absorber. That is, the vented shock absorber 250 becomes "softer" to minimize or eliminate the transfer of loads from the failed shock absorber to the vented shock absorber.

In the case of a total failure of one shock absorber 250, i.e., the sensed pressure within the failed shock absorber is equal to atmospheric pressure, the controller 206 opens the valve 280 of the vented shock absorber and maintains the valve in an open position. In some embodiments, the controller 206 opens the valve 280 of the vented shock absorber 250 until the sensed pressure of the vented shock absorber equals the sensed pressure of the failed shock absorber. In some embodiments, the controller 206 opens the valve 280 of the vented shock absorber 250 until the sensed pressure of the vented shock absorber is within a predetermined range of or has a predetermined proportion to the sensed pressure of the failed shock absorber. It will be appreciated that any number of suitable conditions can be utilized to determined when the valve 280 of the vented shock absorber can be closed, and such variations should be considered within the scope of the present disclosure.

Figure 6:
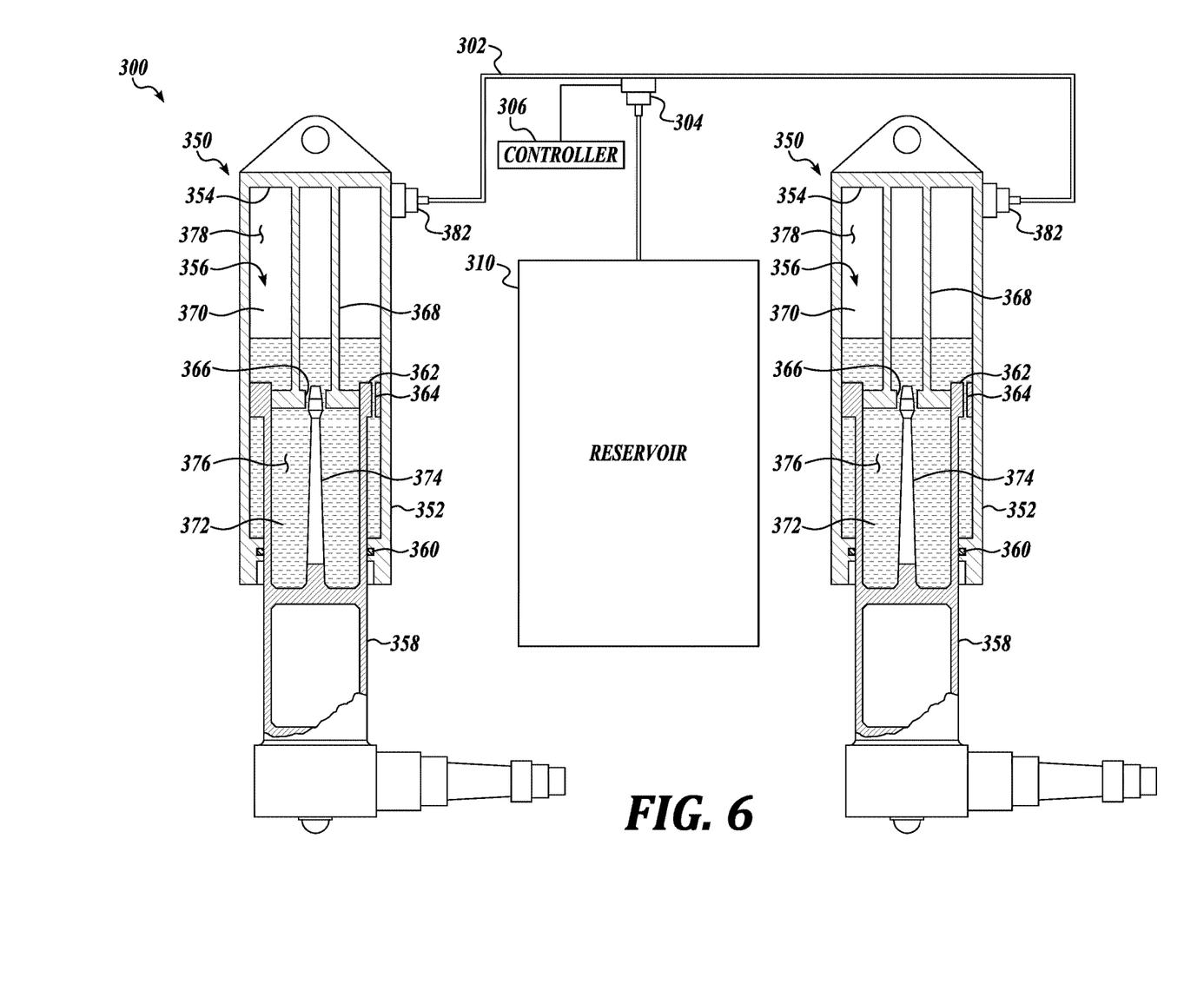
FIG. 6 shows a cross-sectional/schematic view of a shock absorber system for multi-post landing gears according to another embodiment of the present disclosure.

FIG. 6 illustrates another embodiment of a shock absorber system, generally designated 300, formed in accordance with aspects of the present disclosure. The shock absorber system 300 includes a pair of shock absorbers 350 that are substantially similar in construction and operation as the shock absorbers 150 described above with regard to FIG. 4, except for the differences that will be described in more detail below. Components of the shock absorbers 350 shown in FIG. 6 that are labeled with reference number 3XX correspond to similar components labeled with reference number 1XX in FIG. 4, except as noted. For example, the outer housing portion 352 shown in FIG. 6 is similar to the housing portion 152 shown in FIG. 4 unless otherwise described.

The shock absorber system includes a controller 306 in operable communication with the valve 304 to selectively open and close the valve. The valve 304 is in fluid communication with a reservoir 310. When the valve 304 is in the open position, the conduit 302 and the cavity 356 of each shock absorber 350 are in fluid communication with the reservoir 310, which has a high volume relative to the volume of the cavity of each shock absorber. When the valve 304 is in the closed position, the conduit 302 and the cavity 356 of each shock absorber 350 are fluidly isolated from the reservoir 310.

Similar to the cavity 356 of each shock absorber, the reservoir 310 is charged with gas 378. In some embodiments, the reservoir 310 is pre-charged with the gas 378 at a pressure equal to the nominal static pressure (weight-on-wheels) in the shock absorbers 350. When the valve 304 is in the closed position, the reservoir 310 is fluidly isolated from the shock absorbers 350, and the shock absorber system 300 operates in the manner of the previously described shock absorber system 100 shown in FIG. 4. When the valve 304 is in the open position, the reservoir 310 is fluidly connected with the shock absorbers 350. With the reservoir 310 and shock absorbers 350 in fluid communication, the pressure in the shock absorbers and the reservoir equalizes, and the overall volume of gas 378 compressed by the shock absorbers is increased as compared to when the valve 304 is in the closed position. This increase in overall the volume of compressed gas 378 within the system results in a smaller effective spring coefficient for each shock absorber 350. The lower spring coefficient, in turn, provides a "softer" spring that reduces bump loads when the aircraft is on the ground.

In some embodiments, the controller 306 is programmed to open the valve 304 after landing is complete so that the shock absorber system 300 is "stiffer" during landing and "softer" during taxiing and other ground maneuvers. In some embodiments, the controller 306 is programmed to close the valve 304 during the takeoff roll, i.e., the portion of the takeoff during which the airplane accelerates from a standstill to an airspeed that provides sufficient lift for it to become airborne. Closing the valve 304 while the aircraft is still in a weight-on-wheels condition isolates the shock absorbers 350 from the reservoir 310 when the pressure of the gas 378 is at the nominal static pressure so that the shock absorber system is in the desired condition for extension and subsequent landing.

Some embodiments of the presently disclosed shock absorber systems include a controller configured and programmed to receive signals from sensors and to control various components of the shock absorber system, for example, a valve. In some embodiments, the controller is a discrete controller. In some embodiments, the described functions of the controller are performed by one or more other control units, controllers, etc., of the aircraft. In some embodiments, the discrete controller and/or the one or more other control units comprise hardware circuity (e.g., analog and/or digital circuits, etc.) for carrying out its functionality described herein. In other embodiments, the controller or the various control units include, for example, a processor and memory. The memory may include computer readable storage media in read-only memory (ROM), random-access memory (RAM), and keep-alive memory (KAM), for example. The KAM may be used to store various operating variables or program instructions while the processor is powered down. The program instructions, when executed by the processor, is configured to carry out the functionality of the controller described above. In that regard, the processor and/or memory storing the program instructions forms a special purpose controller or control circuit specifically configured to carry out the methodologies and technologies described herein.

The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A shock absorber system for a vehicle, comprising:
a first shock absorber with a first cavity partially filled with a first volume of a damping fluid and partially filled with a first volume of a compressible gas;
a second shock absorber with a second cavity partially filled with a second volume of the damping fluid and partially filled with a second volume of the compressible gas, the second shock absorber being located on a same side of the vehicle as the first shock absorber;
a conduit in fluid communication with the first and second shock absorbers, wherein the second volume of compressible gas maintains constant, uninterrupted fluid communication with the first volume of compressible gas through the conduit, and the first and second cavities are at least partially filled with a gas; and
a valve in fluid communication with an interior portion of the conduit and configured to selectively provide fluid communication with the conduit, wherein the first cavity maintains fluid communication with the second cavity when the valve is in a closed position.

2. The shock absorber system of claim 1, wherein the valve is a fill valve configured to selectively introduce additional compressible gas into the conduit.

3. The shock absorber system of claim 1, further comprising:
a reservoir in fluid communication with the valve; and
a controller operably connected to the valve, the controller being programmed to selectively move the valve between a closed position and an open position, wherein the reservoir is in fluid communication with the conduit when the valve is in the open position, and the reservoir is fluidly isolated from the conduit when the valve is in the closed position.

4. The shock absorber system of claim 3, wherein the controller is programmed to move the valve between a closed position and an open position to selectively control a spring constant of at least one of the shock absorbers.

5. The shock absorber of claim 3, wherein the controller is programmed to increase an effective spring coefficient of the first and second shock absorbers by closing the valve.

6. The shock absorber of claim 3, wherein the controller is programmed to decrease an effective spring coefficient of the first and second shock absorbers by opening the valve.

7. The shock absorber of claim 6, wherein the controller is programmed to increase the effective spring coefficient of the first and second shock absorbers by closing the valve.

8. The shock absorber system of claim 3, wherein the vehicle is an aircraft, and each shock absorber supports a load on a corresponding landing gear.

9. The shock absorber system of claim 8, wherein the controller is programmed to move the valve to the closed position during takeoff roll.

10. The shock absorber system of claim 8, wherein the controller is programmed to move the valve to the open position when the aircraft is in a weight-on-wheels state.

11. The shock absorber system of claim 10, wherein the controller is programmed to move the valve to the open position during a landing sequence.

12. A shock absorber system for a vehicle, comprising:
a first shock absorber with a first cavity partially filled with a first volume of a damping fluid and partially filled with a first volume of a compressible gas;
a second shock absorber with a second cavity partially filled with a second volume of the damping fluid and partially filled with a second volume of the compressible gas, the second shock absorber being located on a same side of the vehicle as the first shock absorber;
a conduit in fluid communication with the first and second shock absorbers, wherein the second volume of compressible gas maintains constant, uninterrupted fluid communication with the first volume of compressible gas through the conduit, and the first and second cavities are at least partially filled with a gas;
a valve in fluid communication with the conduit; and
a reservoir in fluid communication with the valve, wherein the first cavity, the second cavity, and the reservoir are in fluid communication when the valve is in an open position, and wherein the valve isolates the first cavity and the second cavity from the reservoir when the valve is in a closed position, the first cavity and the second cavity being in fluid communication when the valve is in the closed position.

13. The shock absorber system of claim 12, wherein pressure in the first cavity, the second cavity, and the reservoir are equalized when the valve is in the open position.

14. The shock absorber system of claim 12, further comprising a fill valve in fluid communication with an interior portion of the conduit and configured to selectively introduce additional compressible gas into the conduit.

15. The shock absorber system of claim 12, further comprising a controller operably connected to the valve, the controller being programmed to selectively move the valve between a closed position and an open position.

16. The shock absorber system of claim 15, wherein the vehicle is an aircraft, and each shock absorber supports a load on a corresponding landing gear.

17. The shock absorber system of claim 16, wherein the controller is programmed to move the valve to the open position in response to a weight-on-wheels state.

* * * * *